United States Patent
Ohno et al.

(10) Patent No.: US 10,997,440 B2
(45) Date of Patent: May 4, 2021

(54) WEARING DETECTION APPARATUS, IMAGING APPARATUS, RESTRAINT DEVICE, AND WEARING DETECTION PROGRAM

(71) Applicant: Toshiba Digital Solutions Corporation, Kawasaki (JP)

(72) Inventors: Akifumi Ohno, Tokyo (JP); Tatsuei Hoshino, Kunitachi (JP); Tamotsu Masuda, Yokohama (JP); Satoshi Maesugi, Kunitachi (JP); Kousuke Imai, Iwaki (JP); Naoto Shinkawa, Iwaki (JP)

(73) Assignee: Toshiba Digital Solutions Corporation, Kawasaki (JP)

( * ) Notice: Subject to any disclaimer, the term of this patent is extended or adjusted under 35 U.S.C. 154(b) by 72 days.

(21) Appl. No.: 16/288,294

(22) Filed: Feb. 28, 2019

(65) Prior Publication Data

US 2019/0197326 A1 Jun. 27, 2019

Related U.S. Application Data

(63) Continuation of application No. PCT/JP2016/075446, filed on Aug. 31, 2016.

(51) Int. Cl.
*G06K 9/00* (2006.01)
*B60R 22/48* (2006.01)
(Continued)

(52) U.S. Cl.
CPC ............ *G06K 9/00832* (2013.01); *B60R 1/00* (2013.01); *B60R 22/12* (2013.01); *B60R 22/48* (2013.01);
(Continued)

(58) Field of Classification Search
CPC ... B60R 1/00; B60R 2022/4866; B60R 22/12; B60R 22/48; B60R 2300/8006; G06K 9/00832; H04N 5/2253
See application file for complete search history.

(56) References Cited

U.S. PATENT DOCUMENTS

| | | | |
|---|---|---|---|
| 2005/0263992 A1* | 12/2005 | Matsuda | G06K 9/00838 280/735 |
| 2007/0195990 A1* | 8/2007 | Levy | G06K 9/2063 382/100 |
| 2009/0096200 A1 | 4/2009 | Jamison | |

FOREIGN PATENT DOCUMENTS

| | | |
|---|---|---|
| DE | 101 42 792 A1 | 4/2003 |
| JP | 2007-55294 | 3/2007 |

(Continued)

OTHER PUBLICATIONS

International Search Report dated Oct. 4, 2016 in PCT/JP2016/075446, filed on Aug. 31, 2016 (with English Translation).

(Continued)

*Primary Examiner* — Nirav G Patel
(74) *Attorney, Agent, or Firm* — Oblon, McClelland, Maier & Neustadt, L.L.P.

(57) ABSTRACT

According to one embodiments, a wearing detection apparatus includes a restraint device, an imaging device, a control unit, and an output device. The restraint device is to restrain a passenger seated in a seat, and includes a strap an exposed area of which changes when the strap is being worn and not worn. The imaging device captures an image of the restraint device including the strap. The control unit detects from the image captured by the imaging device, a recognition image corresponding to a recognition member provided in an area that is exposed when the strap is worn. The output device outputs a result of detection of the recognition image.

3 Claims, 10 Drawing Sheets

(51) Int. Cl.
    *B60R 22/12*     (2006.01)
    *B60R 1/00*     (2006.01)
    *H04N 5/225*     (2006.01)

(52) U.S. Cl.
    CPC .... *H04N 5/2253* (2013.01); *B60R 2022/4866* (2013.01); *B60R 2300/8006* (2013.01)

(56) References Cited

FOREIGN PATENT DOCUMENTS

| | | |
|---|---|---|
| JP | 2008-68742 | 3/2008 |
| JP | 2009-132303 A | 6/2009 |
| JP | 4403102 | 1/2010 |
| JP | 2010-167860 A | 8/2010 |

OTHER PUBLICATIONS

Written Opinion dated Oct. 4, 2016 in PCT/JP2016/075446, filed on Aug. 31, 2016.

\* cited by examiner

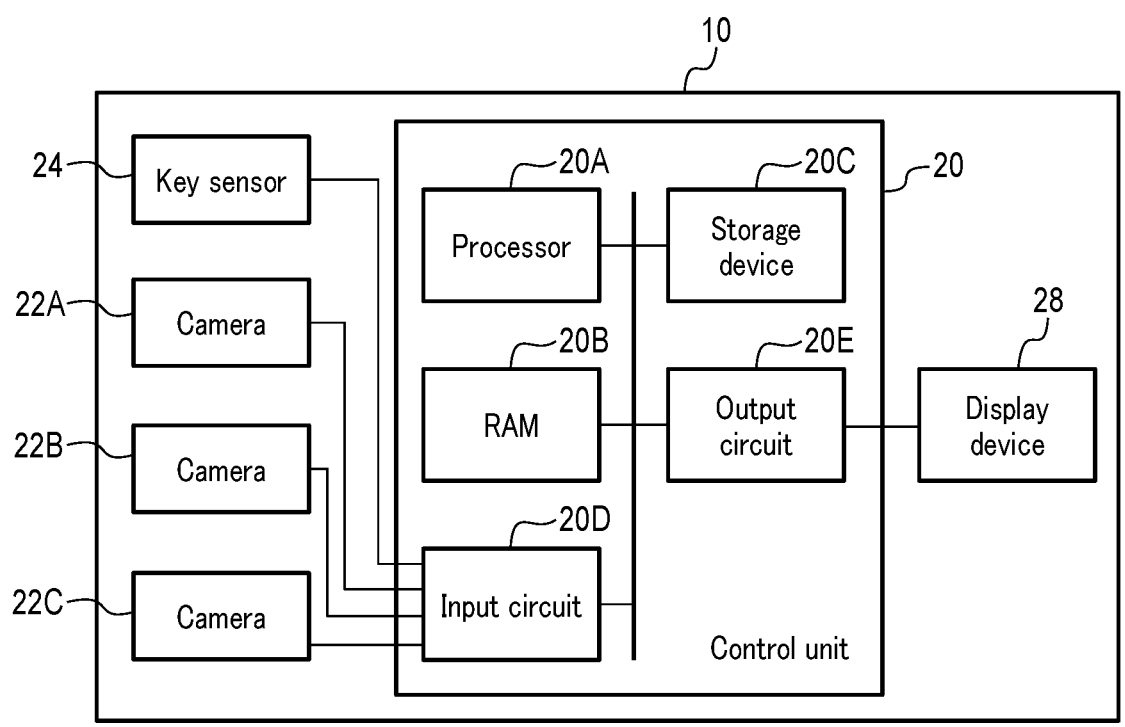
F I G. 1

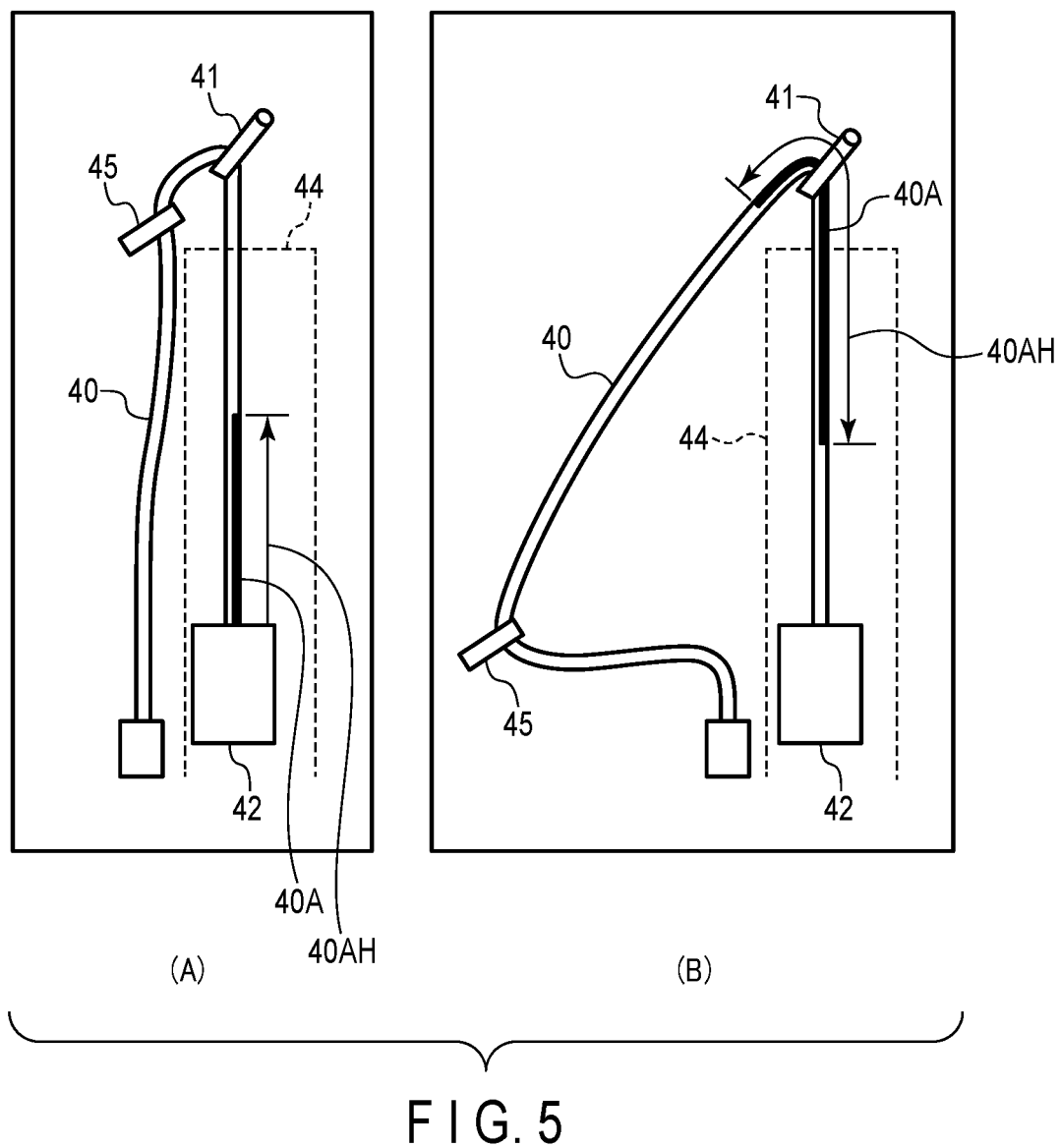
F I G. 5

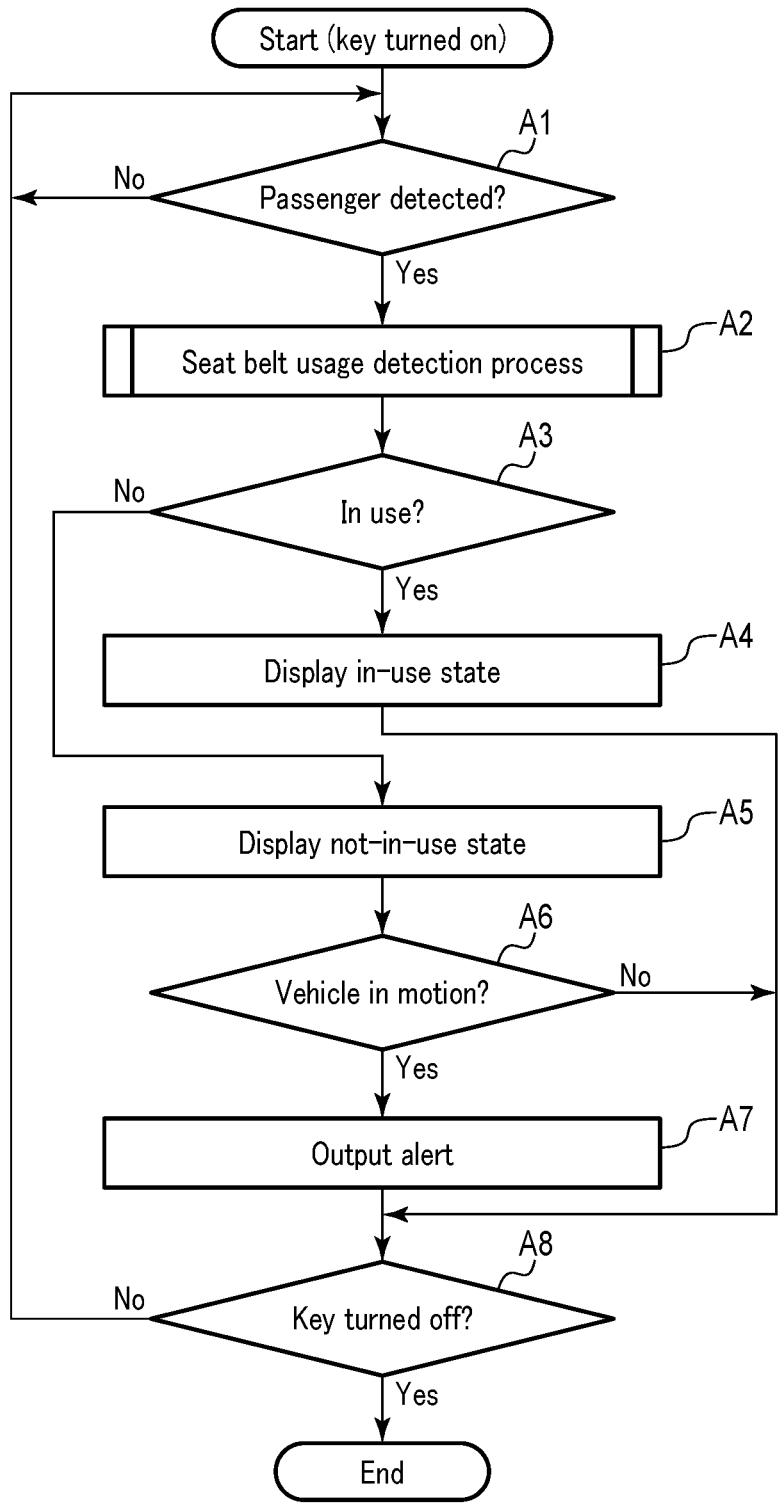
F I G. 7

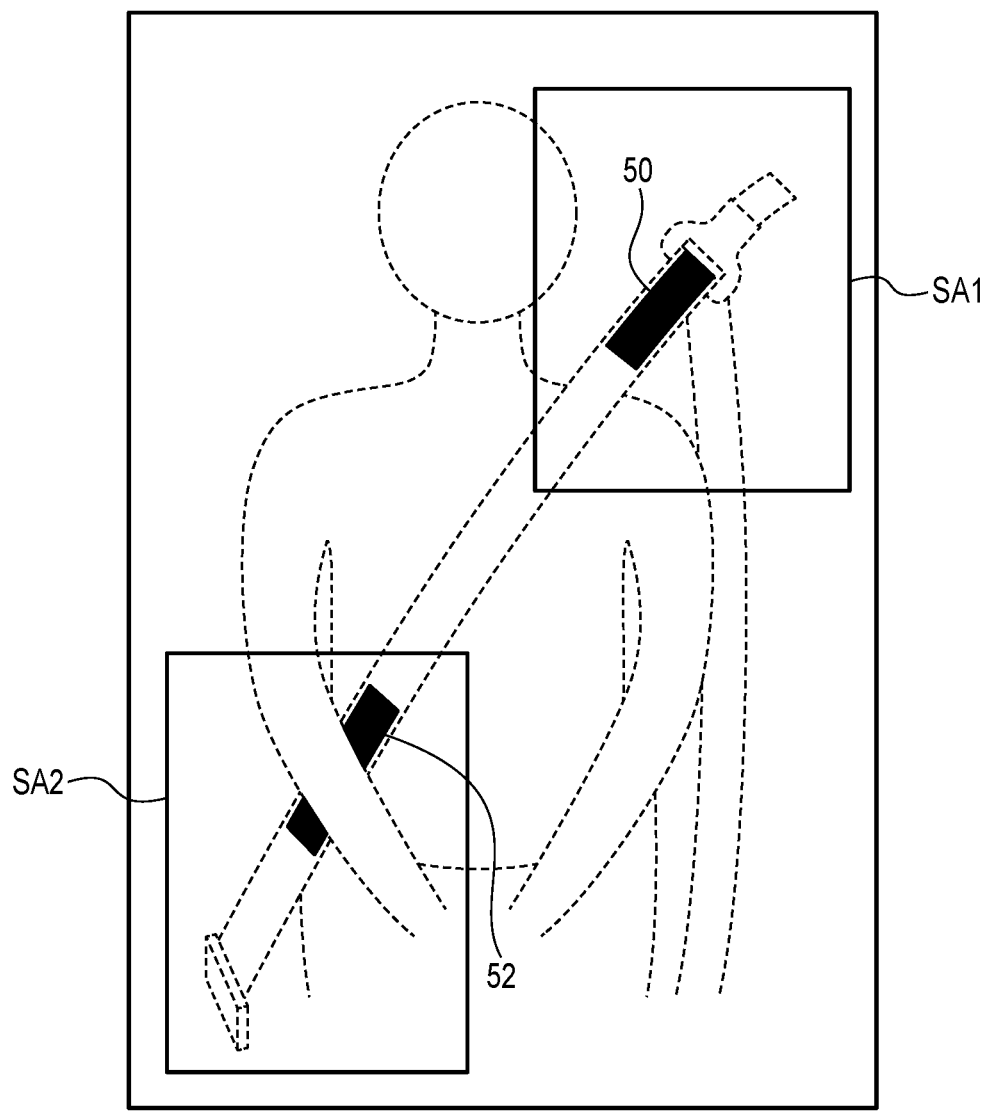
F I G. 9

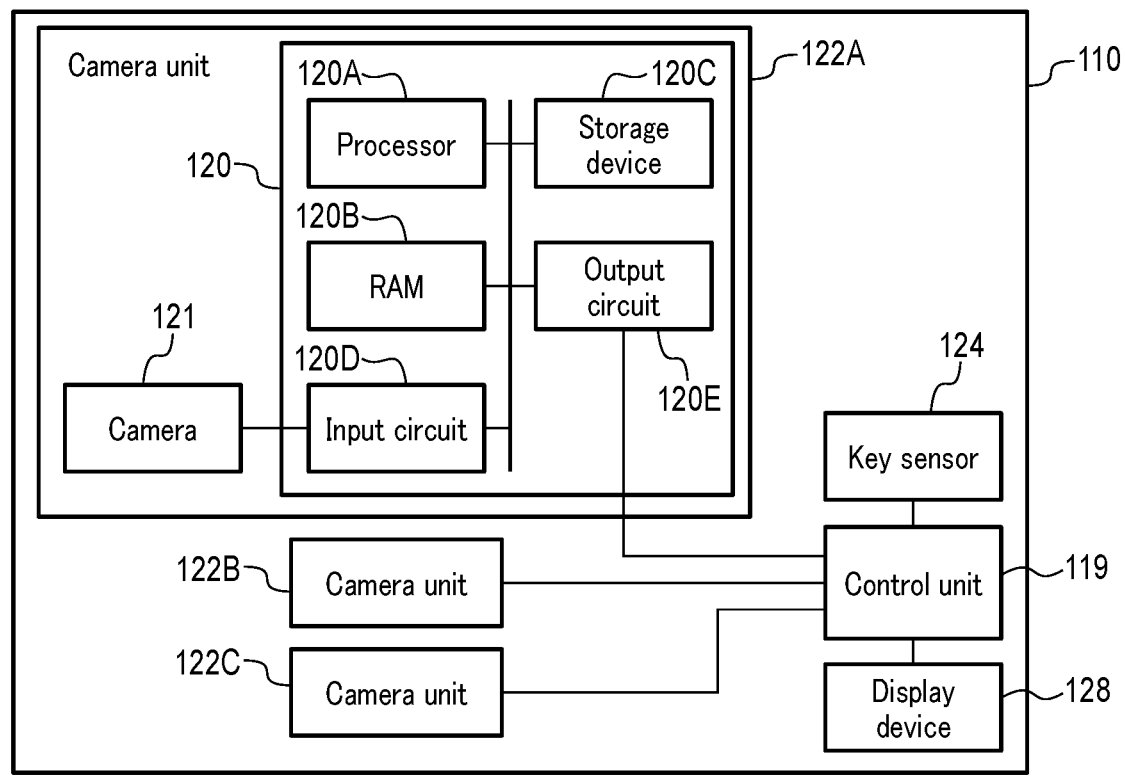
F I G. 10

WEARING DETECTION APPARATUS, IMAGING APPARATUS, RESTRAINT DEVICE, AND WEARING DETECTION PROGRAM

CROSS REFERENCE TO RELATED APPLICATIONS

This application is a Continuation application of PCT Application No. PCT/JP2016/075446, filed Aug. 31, 2016, the entire contents of which are incorporated herein by reference.

FIELD

Embodiments described herein relate generally to an wearing detection apparatus for detection of restraint device wearing, an imaging device, a restraint device, and a wearing detection program.

BACKGROUND

In general, an automobile is provided with restraint devices (hereinafter referred to as seat belts). A seat belt may be worn, for example, by pulling out a strap (webbing) stored in a storage portion and latching it onto the side of the seat. The strap and the seat are latched by engaging a buckle that is connected to the tongue plate, with a strap that is fixed to the seat.

In a conventional technique, a wearing detection apparatus is provided to detect whether a passenger is wearing a seat belt, by detecting whether the buckle and the tongue plate are engaged.

Conventional wearing detection apparatuses determine the use of the seat belt by detecting the buckle being engaged with the tongue plate. This means that, if a passenger does not like to wear a seat belt and therefore engages, with the buckle, a dummy tongue plate that is not connected to the strap, the wearing detection apparatus may erroneously detect that the seat belt is being used. That is, with the wearing detection adopting the mechanical scheme, erroneous detection may easily occur in the wearing detection apparatus.

BRIEF DESCRIPTION OF THE DRAWINGS

FIG. 1 is a block diagram showing the configuration of a wearing detection apparatus according to a first embodiment.

FIG. 5 is a diagram for explaining the portion of the recognition member provided on the strap of the seat belt according to the first embodiment.

FIG. 7 is a flowchart for explaining the operation of the wearing detection apparatus according to the first embodiment.

FIG. 9 is a diagram showing an example of an image that is input from a camera according to the first embodiment.

FIG. 10 is a block diagram showing a configuration of a wearing detection apparatus according to a second embodiment.

DETAILED DESCRIPTION

Figure 2:
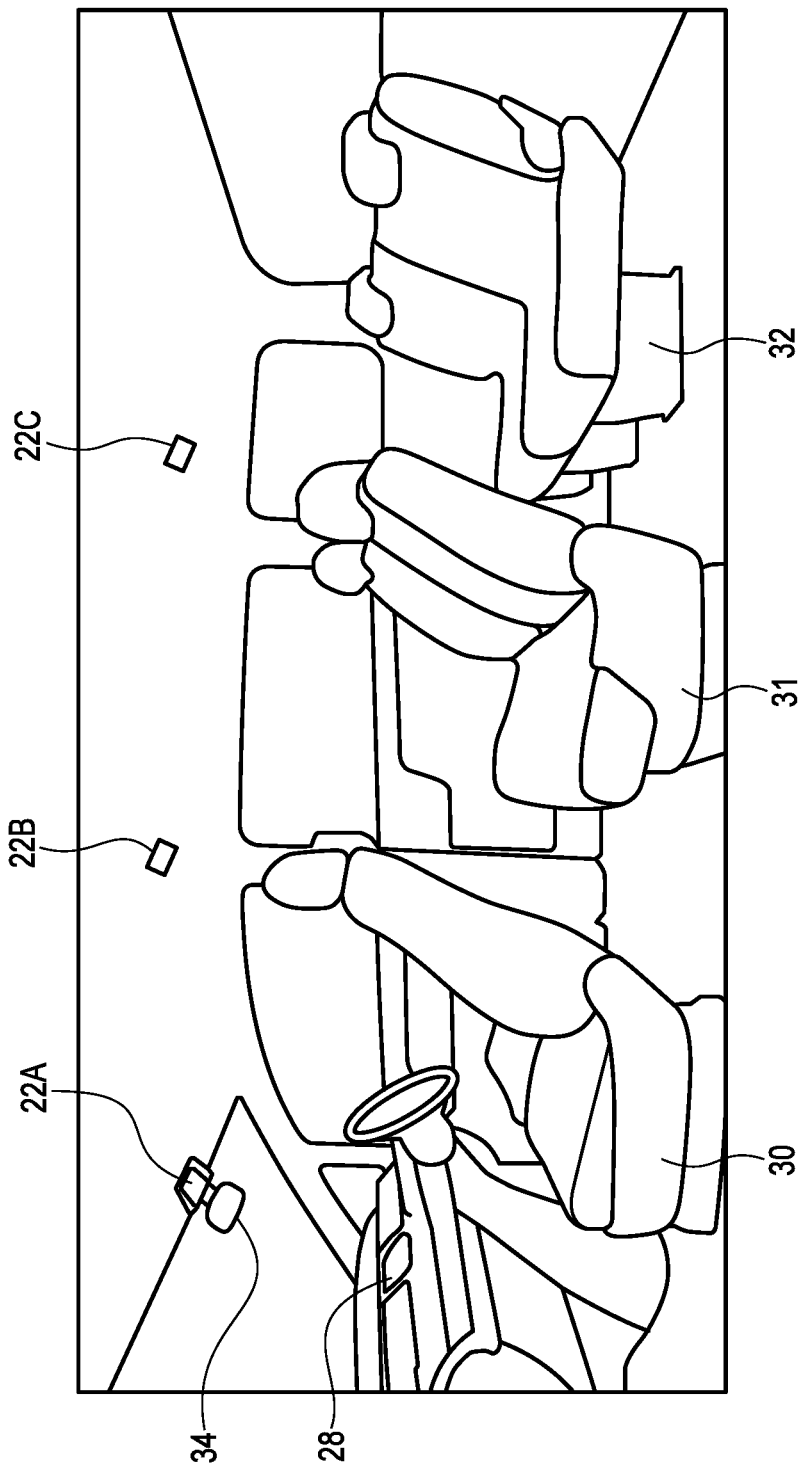
FIG. 2 is a diagram showing the interior of an automobile equipped with the wearing detection apparatus according to the first embodiment.

In general, according to one embodiment, a wearing detection apparatus includes a restraint device, an imaging device, a control unit, and an output device.

The restraint device is to restrain a passenger seated in a seat, and includes a strap an exposed area of which changes when the strap is being worn and not worn.

The imaging device captures an image of the restraint device including the strap.

The control unit detects from the image captured by the imaging device, a recognition image corresponding to a recognition member provided in an area that is exposed when the strap is worn.

The output device outputs the detection result of the recognition image.

Embodiments are described below with reference to the drawings.

First Embodiment

FIG. 1 is a block diagram showing the configuration of a wearing detection apparatus 10 according to the first embodiment. The wearing detection apparatus 10 may be installed in an automobile including restraint devices (hereinafter referred to as seat belts). The automobile includes, for example, a plurality of seats, and a seat belt is provided for each seat. The wearing detection apparatus 10 has a function of detecting, when a passenger is seated in the seat, whether a seat belt is worn by the passenger.

As illustrated in FIG. 1, the wearing detection apparatus 10 includes a seat belt (seat belt 4 in FIG. 3), a control unit 20, cameras 22 (22A, 22B, 22C), a key sensor 24, and a display device (output device) 28.

Figure 3:
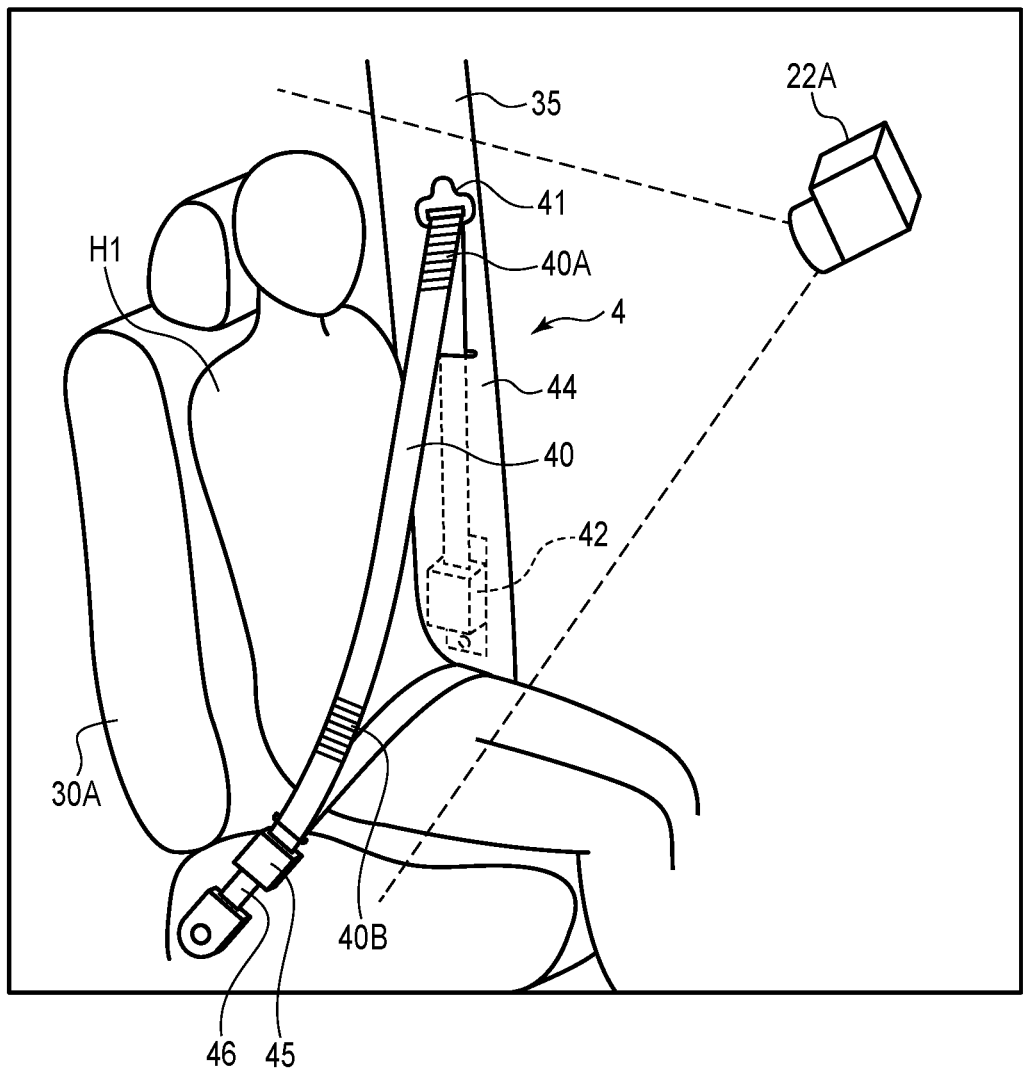
FIG. 3 is a diagram showing an example of a left-side seat of the automobile equipped with the wearing detection apparatus according to the first embodiment.

The seat belt is worn to restrain the passenger seated in the seat, and the seat belt includes a strap, the exposed area of which changes when the strap is being worn and not worn. The detailed structure of the seat belt is shown in FIG. 3.

At least one camera 22 is provided to capture an image of the interior of the automobile. The camera 22 is used, for example, to capture an image for detecting the presence/absence of any passenger, the movement of the passenger, and the wearing of the seat belt. Thus, the camera 22 is mounted at a position where an image including the passenger and the seat belt (at least the strap) can be captured.

According to the first embodiment, the camera 22 may be capable of capturing an image, using light of a specific wavelength outside the visible light spectrum, and a light emitting device may be mounted on the camera 22 to emit light of the specific wavelength outside the visible light spectrum. For the camera 22, a near-infrared camera may be adopted. If this is the case, a light emitting device that emits near-infrared light, such as a near-infrared light emitting diode (LED), is mounted on the camera 22.

By adopting the camera 22 capable of imaging under near-infrared light, an image can be captured to detect the wearing of the seat belt 4, even in environments where imaging cannot be performed under visible light such as at nighttime or inside a tunnel. Although image capturing with visible light at nighttime, for example, requires a light emitting device that emits visible light, such a device may interfere with driving the vehicle. According to the first embodiment, an image is captured with light of a specific wavelength outside the visible light spectrum, and thus there would be no concern of interference with driving the vehicle occurring.

For the camera 22, a near-ultraviolet camera may be adopted. If this is the case, the camera 22 is provided with a light emitting device that emits near-ultraviolet light.

The control unit 20 is to control each component of the automobile in accordance with the input of signals from various sensors, image data from the camera 22, and the like. The control unit 20 may be realized, for example, by an engine control unit (ECU) (or engine computer) mounted in an automobile. Alternatively, the control unit 20 may be configured as an independent dedicated unit (computer), separately from a general ECU mounted in an automobile. In this case, the control unit 20 is realized as a seat belt wearing detection apparatus, and is configured to operate in cooperation with the ECU.

The control unit 20 may realize the function of detecting whether any passenger is seated in the seat, and whether the passenger is wearing the seat belt, based on an image captured by the camera 22. The control unit 20 determines the use of the seat belt by detecting, from the image captured by the camera 22, a recognition image corresponding to the recognition member (identification marking) provided on the area that is exposed when the strap is used.

In addition to the function of detecting whether any passenger is seated in the seat and whether the passenger is wearing the seat belt, the control unit 20 can also realize the function of detecting the movement of the passenger. For example, the control unit 20 may detect the direction of the driver's line-of-sight, steering operation of the wheel, and the like, and conducts the processing for supporting the driving, based on the images captured by the camera 22.

The display device 28 is to display the processing results obtained by the control unit 20, and may be provided, for example, on an instrument panel (dashboard). The display device 28 may display, for example, the detection result of a recognition image of the seat belt obtained by the control unit 20, that is, the determination result of the use of the seat belt.

As shown in FIG. 1, the control unit 20 includes a processor 20A, an RAM 20B, a storage device 20C, an input circuit 20D, and an output circuit 20E.

The processor 20A executes various programs stored in the storage device 20C to activate various functions. Based on the wearing detection program, the processor 20A executes a seat belt wearing detection process for detecting the use of the seat belt based on the image input from the camera 22.

The RAM 20B stores therein temporary data and the like generated from the processing that is executed by the processor 20A.

The storage device 20C is to store programs and data for controlling the operations of the control unit 20, and is realized by a storage medium such as an Electrically Erasable and Programmable ROM (EEPROM (trademark)).

To the input circuit 20D, signals are input from various sensors including the key sensor 24, and data is input from devices such as the cameras 22.

The output circuit 20E outputs the processing results obtained by the processor 20A to different components. For example, the output circuit 20E outputs the result of the wearing detection process obtained by the processor 20A to the display device 28, on which the wearing state of the seat belt is displayed.

The control unit 20 may be provided with a function of communicating with an external information device (e.g., a personal computer) and a network and thereby changing the programs and data stored in the storage device 20C. For example, the control unit 20 may store (install) the wearing detection program in the storage device 20C from an external information device. In this manner, the control unit 20 can execute the wearing detection process.

FIG. 2 is a diagram showing the interior of an automobile equipped with the wearing detection apparatus 10 according to the first embodiment. FIG. 2 shows an example of a configuration in which seats are arranged in three rows (first-row seats 30, second-row seats 31, and third-row seats 32). For example, the seat configuration may be such that two people may be seated in the first-row seats 30, three people may be seated in the second-row seats 31, and three people may be seated in the third-row seats 32. Each seat is provided with a seat belt for restraining the seated passenger. In comparison with the first-row seats 30 and the third-row seats 32, the second-row seats 31 are designed to be movable frontwards and backwards in a larger degree, allowing for a changeable seat arrangement.

For the three-row seats, three cameras 22A, 22B, and 22C may be mounted to correspond to each row of the seats in order to capture images of the inside of the car. The camera 22A may be attached to the ceiling in the vicinity of a rear-view mirror 34 so that an image of the passengers seated in the first-row seats 30 and the seat belts of these seats can be captured. The camera 22B may be attached to the ceiling above the first-row seats 30 so that an image of the passengers seated in the second-row seats 31 and the seat belts of these seats can be captured. The camera 22C may be attached to the ceiling above the second-row seats 31 so that an image of the passengers seated in the third-row seats 32 and the seat belts of these seats can be captured.

The example of FIG. 2 shows the arrangement of three cameras 22A, 22B, and 22C corresponding to the three rows of the seats, but the number of cameras 22 and the positions of cameras 22 are not limited to the configuration shown in FIG. 2. Other than the ceiling, the arrangement may be on the dashboard, back side of the front seats, the pillars, and the like.

A plurality of cameras 22 may be provided for one row of seats. If this is the case, the cameras 22 may be arranged separately from each other so that the imaging ranges can overlap. This reduces the blind spot range in which the camera 22 is unable to capture an image. With such an arrangement, a recognition image provided on the strap of the seat belt is detected from each of the images captured by the cameras 22. The in-wearing state of the seat belt is determined based on the combination of the detection results corresponding to the plurality of cameras 22. In this manner, whether or not in-wearing state of the seat belt is worn can be reliably determined.

Alternatively, a single camera 22 may be used to capture images of the seats of different rows. Furthermore, a camera 22 corresponding to each seat may be provided, or a camera dedicated to the seat belt wearing detection may be provided. For an automobile having seats in the form other than the three-row seats, the number and installation positions of cameras 22 may be determined according to the form of the seats.

As shown in FIG. 2, the display device 28 is arranged on the instrument panel (dashboard). The display device 28 displays, for example, the information indicating the whether or not in-wearing state of the seat belts is worn detected by the wearing detection apparatus 10.

FIG. 3 is a diagram showing an example of a left-side seat 30A (first-row seat 30) of the automobile that is equipped with the wearing detection apparatus 10 according to the first embodiment. FIG. 3 shows the configuration of a three-point seat belt 4 provided for the seat 30A. The seat belt 4 is used for restraining a passenger H1 seated in the seat 30A. FIG. 3 illustrates the passenger H1 wearing the seat belt 4.

The seat belt 4 restrains the passenger H1 by pulling a strap (webbing) 40 over the passenger H1 seated in seat 30A and fastening the strap 40 at three points. The strap 40 has one end stored in a storage portion 44 that is provided, for example, in the pillar 35, and the other end latched to a side surface of the seat 30A (the opposite side with respect to the pillar 35). The strap 40 stored in the storage portion 44 is wound around by a retractor 42 (retractor with a built-in load limiter) in the storage portion 44 in a retractable manner.

When the seat belt 4 is not used, the strap 40 is in the state of being stored in the storage portion 44. When the seat belt 4 is used, the strap 40 is pulled out of the storage portion 44 and latched to the other side of the seat 30A by way of the tongue plate 45. The tongue plate 45 is provided on the strap 40 in a slidable manner. On the other side of the seat 30A (the side that does not face the pillar 35), a buckle 46 is fixed in a manner so as to be engageable with the tongue plate 45. The tongue plate 45 and the buckle 46 serve as a fixture tool for fixing the strap 40 that is pulled out of the storage portion 44. Alternatively, the buckle 46 may be provided on the strap 40, and the tongue plate 45 may be provided on the seat 30A.

A belt guide 41 is provided on the pillar 35 at a position higher than the shoulder of the passenger H1 seated in the seat 30A. The belt guide 41 (guide member) holds the strap 40 pulled down from the storage portion 44, thereby guiding the strap 40 to the position higher than the shoulder of the passenger H1. With the tongue plate 45 engaged with the buckle 46, the strap 40 is used as a shoulder belt fastened from the position above the shoulder of the passenger H1 obliquely to the waist, and as a lap belt fastened across the waist of the passenger H1 in the lateral direction (vehicle width direction).

As shown in FIG. 3, recognition members 40A and 40B are provided as recognition markings in the area of the strap 40 that is exposed when the seat belt 4 is worn. In FIG. 3, the recognition members 40A and 40B are illustrated as being recognizable, but they are actually designed in an invisible manner in a normal visible light environment. According to the first embodiment, the recognition members 40A and 40B are designed to reflect light of a specific wavelength outside the visible light spectrum, such as near-infrared light.

The recognition member 40A is provided in the area of the strap 40 that is exposed around the position above the shoulder of the passenger when the strap 40 guided by the belt guide 41 is fastened by the tongue plate 45 and the buckle 46. That is, the recognition member 40A is provided so as to fall within the range that can be reliably captured by the camera 22. The strap 40 around the position above the passenger's shoulder will not be hidden by the passenger's body parts (such as the arms, head, and hair), or the passenger's bag or clothes. Thus, the detection of the recognition member 40A can be reliably determined, based on the image that is captured in the vicinity of the passenger's shoulder by the camera 22.

The recognition member 40A is provided in a range that falls within the imaging range by the camera 22A when the strap 40 is used with no passenger seated in the seat 30A. Furthermore, the recognition member 40A is provided on the strap 40 in a continuous pattern so as to appear around the position above the passenger's shoulder, between the state where the passenger is not present in the seat 30A and the state where the passenger H1 of the maximum body size assumed is in the vehicle.

If the recognition member 40A is in the exposed state, the strap 40 is recognized as in the state of being pulled from the storage portion 44 and bringing the tongue plate 45 and the buckle 46 to engagement with each other. That is, the seat belt 4 can be determined as being in the in-wearing state.

In addition to the recognition member 40A, a recognition member 40B is also provided in the strap 40 as shown in FIG. 3. The recognition member 40B is provided in the area near the tongue plate 45 and the buckle 46, with the tongue plate 45 being engaged with the buckle 46.

When the recognition member 40B is exposed in the vicinity of the tongue plate 45 and the buckle 46, the strap 40 is recognized as being in the state of being pulled out from the storage portion 44 and bringing the tongue plate 45 and the buckle 46 into engagement with each other. That is, by detecting the state of both the recognition member 40A and the recognition member 40B being exposed, the state of the seat belt 4 being used can be reliably determined.

The strap 40 can be provided at least with the recognition member 40A, and the recognition member 40B is not necessarily required.

Figure 4:
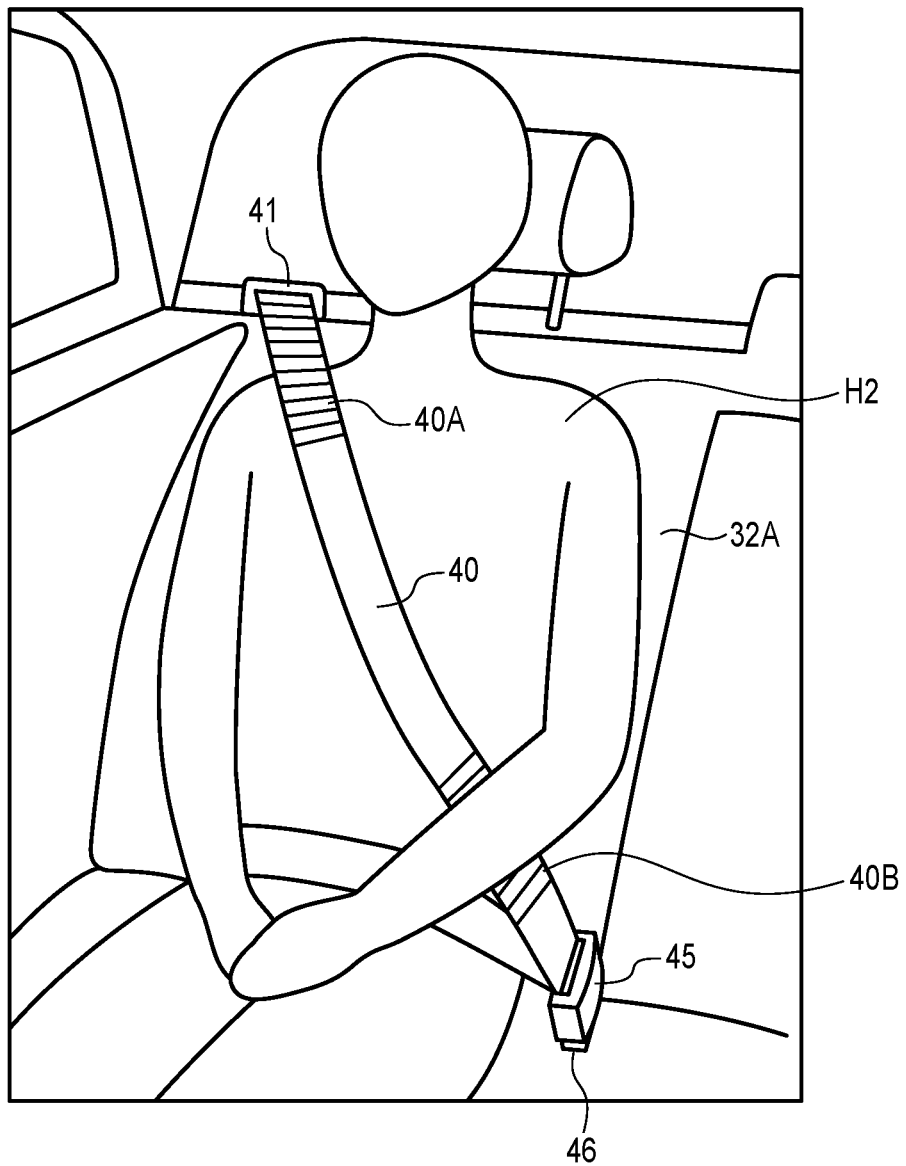
FIG. 4 is a diagram showing the configuration of a three-point seat belt provided in a right-side seat according to the first embodiment.

FIG. 4 shows the configuration of the three-point seat belt 4 provided on the right-side seat 32A (third-row seat 32). FIG. 4 shows a state in which the seat belt 4 is being used for restraining a passenger H2 seated in a seat 32A. Although the seat belt 4 shown in FIG. 4 is basically the same as the seat belt 4 shown in FIG. 3, the position of the belt guide 41 is different due to the form of the seat.

In the seat belt 4 shown in FIG. 3, the storage portion 44 is provided in the pillar 35. In FIG. 4, the storage portion 44 (not shown) is provided at the back of the seat 32A. The opening through which the strap 40 is pulled from the storage portion 44 is provided in the vicinity of the upper end of the seat 32A. This opening therefore serves as the belt guide 41, and the strap 40 can be pulled from a position higher than the shoulder of the passenger H2 seated in the seat 32A.

As shown in FIG. 4, the recognition members 40A and 40B provided on the strap 40 are exposed when the seat belt 4 is being used in the right-side seat 32A. That is, the recognition member 40A is exposed around the position of the strap 40 above the passenger's shoulder, and the recognition member 40B is exposed in the vicinity of the tongue plate 45 and the buckle 46.

FIG. 5 is a diagram for explaining the area of the recognition member 40A provided on the strap 40 of the seat belt 4 according to the first embodiment.

Part (A) of FIG. 5 shows the state of the strap 40 that is not in-wearing. As shown in part (A) of FIG. 5A, when the seat belt 4 is not in-wearing, the strap 40 is wound up by the retractor 42 that is arranged inside the storage portion 44. Therefore, the area 40AH where the recognition member 40A is provided on the strap 40 is stored inside the storage portion 44. That is, without being exposed, an image of the recognition member 40A will not be captured by the camera 22.

Part (B) of FIG. 5 shows the state of the strap 40 when the seat belt 4 is used. As shown in part (B) of FIG. 5, when the seat belt 4 is used, the strap 40 is pulled out of the storage portion 44. As a result, the area 40AH of the strap 40 in which the recognition member 40A is provided is exposed to the outside of the storage portion 44, allowing the camera 22 to capture an image thereof.

The area 40AH in which the recognition member 40A is provided is determined in accordance with the possible maximum body size of a passenger, and therefore the area 40AH can be exposed at least in the area of the position above the passenger's shoulder.

Figure 6:
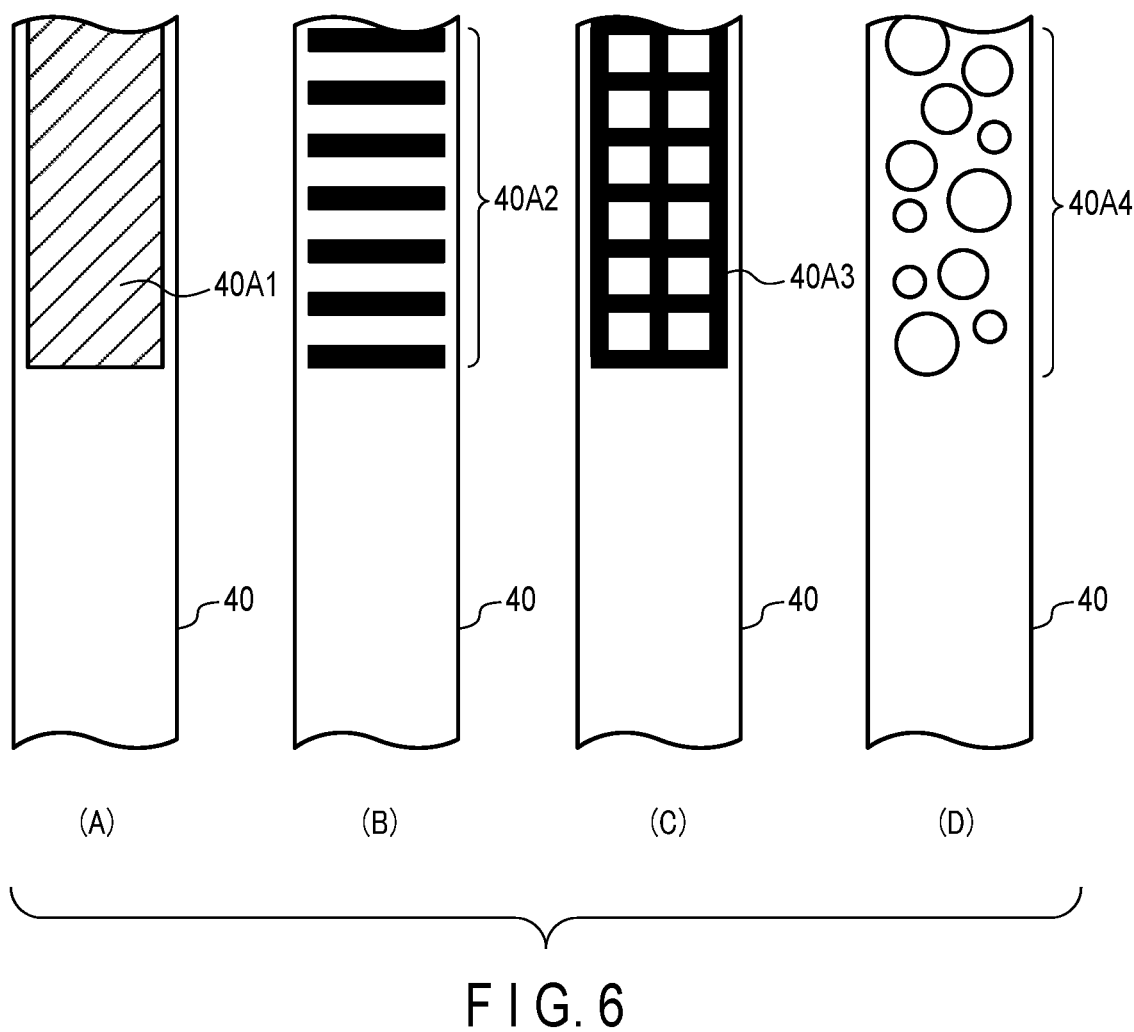
FIG. 6 is a diagram showing examples of recognition members provided on the strap according to the first embodiment.

FIG. 6 is a diagram showing an example of the recognition member 40A provided on the strap 40.

The strap 40 may be formed by woven polyester fibers. For example, the recognition member 40A may be formed at the manufacturing step of the strap 40 by weaving in a material of a recognition member that can be captured by the camera 22 (i.e., capable of reflecting near-infrared light). A fiber material of a recognition member may be woven in with polyester fibers, or a material of the recognition member may be incorporated by placing it between two belt-like members made of polyester fibers. As materials which can be captured by the camera 22, a silicone, metal, resin, fabric having a specific level of roughness, and the like may be adopted, or any other materials may be adopted. That is, as long as the area in which the recognition member 40A is provided and the area in which the recognition member 40A is not provided are distinguishable in the image captured by the camera 22, any material may be adopted.

Furthermore, as shown in parts (A) (B) (C) and (D) of FIG. 6, the recognition member 40A may be formed into specific patterns (shapes) in a manner that the recognition image corresponding to the recognition member 40A can be easily identified from the image captured by the camera 22.

The recognition member 40A1 in part (A) of FIG. 6 shows an example in which the pattern is formed as a flat surface. Since the recognition member 40A1 is provided basically on the entire surface of the strap 40, the image thereof can be easily captured by the camera 22, regardless of the state of the use of the strap 40.

The recognition member 40A2 in part (B) of FIG. 6 shows an example in which a plurality of linear patterns are aligned in a row at predetermined intervals. The recognition member 40A3 in part (C) of FIG. 6 shows an example in which a lattice pattern is arranged. The recognition member 40A4 in part (D) of FIG. 6 shows an example in which a plurality of patterns having different sizes of a predetermined shape (e.g., circles) are arranged. The patterns of the recognition members 40A2, 40A3, and 40A4, having simple shapes, can be easily identified from the image captured by the camera 22. Furthermore, since the recognition members 40A2 and 40A3 include linear patterns arranged in the fibrous direction of the strap 40, the material of the recognition members can be easily interwoven when manufacturing the strap 40. The recognition member 40A4 may be formed by placing a pattern of a predetermined shape between two belt-like members of the strap 40.

In this manner, by forming the recognition member 40A into a specific pattern, the recognition member can be easily identified from the image captured by the camera 22. Even if objects other than the recognition member 40A in the vehicle are detected in the operation of capturing images by the camera 22 using the near-infrared light, the identification can be facilitated based on the pattern of the recognition member 40A. It is therefore preferable that the recognition member 40A be provided with a pattern that is distinguishable from any object that can be captured under near-infrared light inside the vehicle.

The patterns shown in parts (A) to (C) FIG. 6 are uniformly provided in the strap 40 to have the same shapes. However, these shapes may be varied in accordance with the position provided in the strap 40.

For example, the pattern of the recognition member 40A1 shown in part (A) of FIG. 6 may be formed to exhibit a gradation in the image captured by the camera 22. For example, the pattern may be formed in such a manner that the pattern changes gradually from the edge of the recognition member 40A1. In the recognition members 40A2 and 40A3, the intervals of the linear patterns or the thickness of the linear patterns may be changed in accordance with the to-be-provided positions of the strap 40.

In the above manner, by changing the shape of the recognition member 40A in accordance with the position of the strap 40 where the recognition member 40A is provided, the length of the pulled-out strap 40 from the storage portion 44 may also be identified, based on the recognition image corresponding to the recognition member 40A.

Only the recognition member 40A has been described above, but the recognition member 40B may have the same pattern as the recognition member 40A. Since the recognition members 40A and 40B are detected at different positions in the image captured by the camera 22, the recognition members are identifiable even if they have the same patterns.

Alternatively, the recognition member 40B may have a pattern different from the recognition member 40A. If this is the case, the recognition images corresponding to the recognition members 40A and 40B can be clearly identified in the image captured by the camera 22, based on the difference in the patterns of the recognition images.

Furthermore, the patterns of the recognition member 40A (or the recognition member 40B) provided in the strap 40 of the seat belt 4 may be differentiated for each seat. For example, by differentiating the patterns of the recognition members 40A for the seats, the recognition members 40A of the seat belts 4 provided in different seats can be easily distinguished based on the image captured by a single camera 22.

According to the first embodiment, the recognition members 40A and 40B are provided in the strap 40 in a visually unrecognizable manner under visible light. This configuration makes it difficult for a passenger with malicious intent to attach a fake recognition member for the purpose of deception concerning the use of the seat belt 4. In other words, with the material or pattern of the recognition members 40A and 40B being visually unrecognizable, it becomes difficult for fake recognition members to be fabricated.

If the recognition members 40A and 40B are allowed to be visually recognizable, a special paint (e.g., high solar reflectance paint) that can control the reflection property of the light in the near-infrared region may be applied to the strap 40 to form the recognition members 40A and 40B. Alternatively, a material that can be captured under near-infrared light may be adhered to the strap 40. This facilitates the manufacture of the strap 40, on which the recognition members 40A and 40B are provided.

Next, the operation of the wearing detection apparatus 10 according to the first embodiment will be described.

FIG. 7 is a flowchart for explaining the operation of the wearing detection apparatus 10 according to the first embodiment.

When notified from the key sensor 24 that the key has been turned on, the processor 20A executes a detection process to detect the presence or absence of any passenger. Based on the image data input from the camera 22, the processor 20A identifies whether a passenger is present in the captured image by using an existing image processing technique. For example, the processor 20A may detect a moving object in a region of the image corresponding to the seat. When a moving object is detected, whether the shape of the object corresponds to a person is determined. The presence or absence of a passenger can be detected in this manner. The processor 20A executes the detection process for all the seats based on the images input from the camera 22.

Upon detecting the presence of a passenger (yes at step A1), the processor 20A executes the seat belt wearing detection process to detect whether the passenger is wearing the seat belt 4, based on the wearing detection program (step A2).

Figure 8:
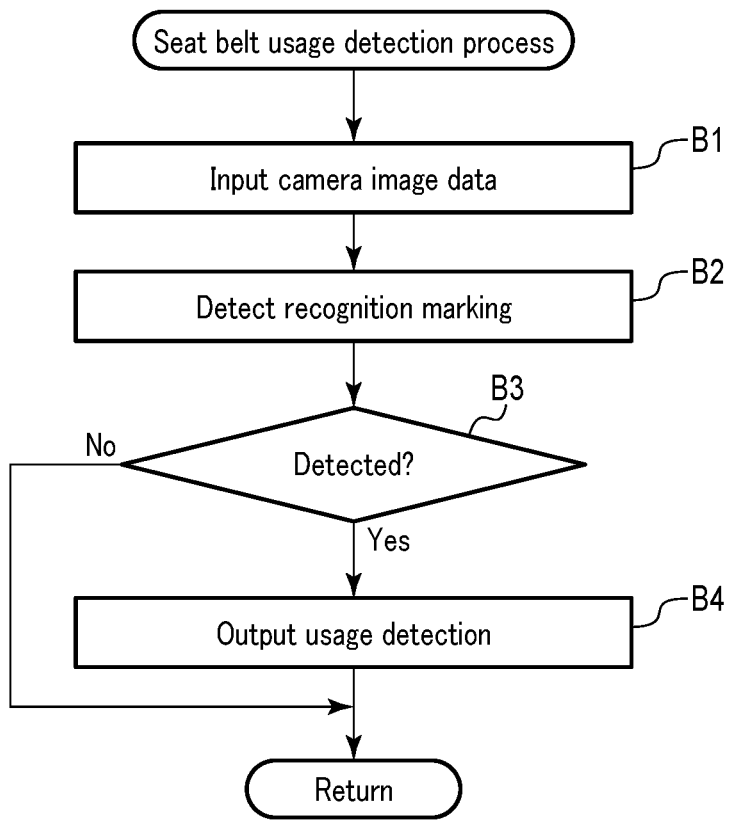
FIG. 8 is a flowchart for explaining the operation of the seat belt wearing detection process according to the first embodiment.

FIG. 8 is a flowchart for explaining the operation of the seat belt wearing detection process according to the first embodiment.

The processor 20A receives the image data of the captured image from the camera 22, which captures the image of the seat in which a passenger is present (step B1). As described above, the camera 22 may capture an image under near-infrared light.

The processor 20A detects recognition images corresponding to the recognition markings (recognition members 40A and 40B) from the image input from the camera (step B2). The processor 20A may extract an image region corresponding to a recognition image, and execute a recognition process on this image region, based on the patterns of the recognition members 40A and 40B.

FIG. 9 shows an example of an image input from the camera 22 according to the first embodiment. In FIG. 9, the image of the region corresponding to one seat is illustrated. The region SA1 in FIG. 9 corresponds to the region around the position above the shoulder of the passenger, and the region SA2 corresponds to the vicinity of the fixture of the seat.

The processor 20A detects a recognition image 50 corresponding to the recognition member 40A from the region SA1. The processor 20A also detects a recognition image 52 corresponding to the recognition member 40B from the region SA2. FIG. 9 shows an example in which the recognition members 40A and 40B having the pattern in part (A) of FIG. 6 are adopted, and this example includes recognition images of a uniform pattern captured in near-infrared light. By targeting at the regions SA1 and SA2 and detecting the recognition images therefrom, the length of the processing time can be reduced in comparison with the processing of the entire image. Furthermore, because an image that does not correspond to the recognition member 40A or 40B is less likely to be detected, recognition images can be prevented from being erroneously recognized.

When a recognition region is detected (yes at step B3), the processor 20A outputs the in-wearing state of the seat belt as a detection result (step B4). The control unit 20 outputs the in-wearing state of the seat belt when a recognition image corresponding at least to the recognition member 40A is detected. Alternatively, the in-wearing state of the seat belt may be output when recognition images corresponding to both of the recognition members 40A and 40B are detected.

When the in-wearing state is determined in the seat belt wearing detection process (yes at step A3), the processor 20A causes the display device 28 to display the information indicating the in-wearing state of the seat belt in the corresponding seat (step A4). The processor 20A executes, until the key is turned off, the seat belt wearing detection process (step A2) every predetermined interval (every minute) to confirm whether the seat belt 4 is being used (no at step A8).

On the other hand, if the in-wearing state is not determined in the seat belt wearing detection process (no at step A3), or in other words, if no recognition image is detected from the image captured by the camera 22, the processor 20A causes the display device 28 to display the information indicating the not-in-wearing state (seat belt not yet being worn) regarding the seat belt of the corresponding seat (step A5). The processor 20A executes the seat belt wearing process (step A2) every predetermined interval to confirm whether the seat belt 4 is being used, until the key is turned off (no at step A8). When the in-wearing state is detected, the processor 20A causes the display device 28 to display the in-wearing state in the manner as described above.

In case the vehicle is set in motion (yes at step A6) in the state where not all the passengers are wearing the seat belt 4, the processor 20A outputs an alert to notify the not-in-wearing state of the seat belt 4. For example, the processor 20A displays information indicating an alert on the display device 28, or causes a speaker (not shown) to output an alert sound.

After setting the vehicle in motion, the processor 20A continues to execute the seat belt wearing detection process, and to output the alert until the use of the seat belt 4 is detected for all the passenger-seated seats. During the output of the alert, the seat belt wearing detection process is executed at shorter intervals (e.g., intervals of one second) than the length of time predetermined for the use being detected.

In the above description, an image of one seat is captured by one camera 22. In case an image of one seat is captured by a plurality of cameras 22 (e.g., two cameras 22), the seat belt wearing detection process may be executed onto the images captured by the plurality of cameras 22 for one seat. For example, if the not-in-wearing state is determined as a result of the seat belt wearing detection process that is executed on the image captured by the first camera 22, the seat belt wearing detection process is executed on the image captured by the second camera 22. As a result of this, if a recognition image is detected, it is determined that the seat belt is in-wearing. In other words, by combining the processing results of the target images captured by a plurality of cameras 22, the use of the seat belt in one seat is determined. In this manner, the in-wearing or not-in-wearing state of the seat belt can be reliably determined.

In this manner, the wearing detection apparatus 10 according to the first embodiment can detect the use of the seat belt 4 in each passenger-seated seat, not by a mechanical method of detecting the engagement of the tongue plate 45 and the buckle 46, but based on the images captured by the cameras 22. In addition, the wearing detection apparatus 10 determines the presence or absence of a passenger in each seat based on the image captured by the camera 22. Thus, there is no need for installing a weight sensor for detecting the presence or absence of a passenger in each seat, or an engagement sensor for detecting the engagement of the tongue plate 45 and the buckle 46. This eliminates the need for laying a cable for transmitting signals from a weight sensor or engagement sensor to the wearing detection apparatus 10, thereby reducing the number of wires to be laid in the automobile. In particular, when the seats like the second-row seats 31 are capable of large movements, interference with cables that extend from the seats can be avoided.

Second Embodiment

Next, a second embodiment will be described.

In the configuration according to the first embodiment shown in FIG. 1, the image data is input from a plurality of cameras 22 to the control unit 20, and the seat belt wearing detection process is executed in the control unit 20. According to the second embodiment, the seat belt wearing detection process is executed in a camera unit, and the detection result is output to the control unit.

FIG. 10 is a block diagram showing the configuration of a wearing detection apparatus 110 according to the second embodiment. For the same components as those in FIG. 1, their names are unchanged, and a detailed description of these components is omitted.

In FIG. 10, for example, three camera units 122 (122A, 122B, and 122C) are provided. The camera unit 122A has the same configuration as the camera units 122B and 122C.

The camera unit 122A includes a detection circuit 120 and a camera 121. The camera 121 is configured in a similar manner to the camera 22 according to the first embodiment. That is, the camera 121 may capture an image, for example, with near-infrared light.

The detection circuit 120 can detect a recognition image corresponding to a member configured to reflect light of a specific wavelength from an image captured by the camera 121. That is, the detection circuit 120 has a function of detecting the same recognition image as in the control unit 20 of the first embodiment. The detection circuit 120 executes the seat belt wearing detection process based on the image from the camera 121.

If a recognition region is detected, the detection circuit 120 outputs the in-wearing state of the seat belt to the control unit 119 as the detection result. If this is the case, the control unit 119 causes the display device 128 to display the information indicating the in-wearing state of the seat belt for the corresponding seat. On the other hand, if a recognition region is not detected by the detection circuit 120, the control unit 119 causes the display device 128 to display the information indicating the not-in-wearing state of the seat belt (the seat belt not yet being worn) for the corresponding seat.

In this manner, the camera unit 122 according to the second embodiment can be used as a seat belt wearing detection sensor by providing the detection circuit 120 that executes the seat belt wearing detection process in the camera unit 122. Thus, an existing ECU may be configured so that a signal (indicating the use being detected or not detected) may be input from the camera unit 122, in place of a signal from the sensor that detects the engagement of the tongue plate 45 with the buckle 46.

In the description of the above-described embodiments, an automobile equipped with seat belts (restraint devices) is described as an example, but these embodiments may be applied to other vehicles equipped with seat belts. For example, when a ride for an amusement facility is to be equipped with a restraint device, the embodiments may be applied to the detection of the use of this restraint device.

In the description of the above-described embodiments, the detection result of a recognition image of the seat belt by the control unit 20, or in other words, the determination result of the use of the seat belt, is displayed on the display device. However, output devices other than the display device may be adopted. For example, sound may be output from a speaker, or vibration may be produced by a vibrating device such as a vibrator, in accordance with the detection result of a recognition image.

In addition, the seat belt 4 shown in FIGS. 3 and 4 is described as a three-point seat belt, but the embodiments may also be applied, for example, to a two-point or four-point seat belt. For a four-point seat belt, recognition members provided on the two straps that are pulled out at two positions are detected in the manner as described above. As a result, whether or not each of the two straps is being used can be detected.

The method that has been described in connection with each of the above embodiments may be stored and distributed as a computer-executable program (wearing detection program) in a storage medium such as a magnetic disk (e.g., a flexible disk and a hard disk), an optical disk (e.g., a CD-ROM and a DVD), a magneto-optical disk (MO), or a semiconductor memory.

Furthermore, as the storage medium, the storage format may be in any form, as long as the storage medium can store a program and can be read by a computer.

Furthermore, the storage medium according to the embodiments is not limited to a medium independent from a computer, but may include a storage medium in which a program transmitted through a LAN, the Internet, or the like is downloaded, and is stored or temporarily stored.

The storage medium is not limited to one. The processing of the above embodiments executed from a plurality of media is also included in the storage medium of the present invention. The configuration of a medium may be configured in any manner.

The computer according to the embodiments may execute each processing of each of the embodiments based on the program stored in the storage medium. The computer may have a device including one personal computer, or a system including a plurality of devices connected via a network.

The computer in each embodiment also includes an arithmetic processing device, a microcomputer, and the like included in an information processing device, and collectively refers to apparatuses and devices that can realize the functions of the present invention in accordance with programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wearing detection apparatus comprising:
a restraint device configured to be used for restraining a passenger seated in a seat, the restraint device including a strap, an exposed area of which changes when the strap is being worn and not worn, the strap having a first region pulled to a position above a shoulder of the passenger seated in the seat and a second region in vicinity of a fixture at a time of the passenger wearing the strap, wherein recognition members are attached to the first region and the second region;
an imaging device configured to capture an image of the restraint device including the strap; and
a control unit configured to detect, from the image captured by the imaging device, a first recognition image corresponding to the recognition member attached to the first region in the image and a second recognition image corresponding to the recognition member attached to the second region in the image, and output a result of detection indicating that the restraint device is being worn when both the first recognition image and the second recognition image are detected, wherein the recognition members include a specific pattern, a plurality of seats and a plurality of restraint devices are arranged, the recognition members have patterns that differ between the restraint devices, the imaging device captures the image of the restraint devices including the straps, and the control unit detects the first recognition image and the second recognition image for each of the restraint devices, and outputs the detection result indicating whether the restraint device is being worn when both the first recognition image and the second recognition image for each respective restraint device are detected.

2. A camera unit comprising:

an imaging device configured to capture an image of a restraint device including a strap with light of a specific wavelength outside the visible light spectrum, wherein the restraint device is configured to be used for restraining a passenger seated in a seat, an exposed area of the strap changes when the strap is being worn and not worn, the strap has a first region pulled to a position above a shoulder of the passenger seated in the seat and a second region in vicinity of a fixture at a time of the passenger wearing the strap, and recognition members are attached to the first region and the second region; and a detection circuit configured to detect, from the image captured by the imaging device, a first recognition image corresponding to the recognition member attached to the first region in the image and a second recognition image corresponding to the recognition member attached to the second region in the image, and output a result of detection indicating that the restraint device is being worn when both the first recognition image and the second recognition image are detected, wherein the recognition members include a specific pattern, a plurality of seats and a plurality of restraint devices are arranged, the recognition members have patterns that differ between the restraint devices, the imaging device captures the image of the restraint devices including the straps, and the detection circuit detects the first recognition image and the second recognition image for each of the restraint devices, and outputs the detection result indicating whether each said restraint device is being worn when both the first recognition image and the second recognition image for each respective restraint device are detected.

3. A non-transitory computer-readable storage medium having stored thereon a wearing detection program which is executable by a computer, when executed, cause a computer to:

instruct an imaging device to capture an image of a restraint device including a strap, an exposed area of which changes when the strap is worn and when the strap is not worn, the strap having a first region pulled to a position above a shoulder of the passenger seated in the seat and a second region in vicinity of a fixture at a time of the passenger wearing the strap, wherein recognition members are attached to the first region and the second region, wherein the recognition members include a specific pattern, a plurality of seats and a plurality of restraint devices are arranged, and the recognition members have patterns that differ between the restraint devices and the imaging device is instructed to capture the image of the restraint devices including the straps;

detect for each of the restraint devices, from the image captured by the imaging device, a first recognition image corresponding to the recognition member attached to the first region in the image and a second recognition image corresponding to the recognition member attached to the second region in the image, and output a result of detection indicating whether each restraint device is being worn when both the first recognition image and the second recognition image for each respective restraint device are detected.

* * * * *